United States Patent [19]
Nishi et al.

[11] Patent Number: 5,510,080
[45] Date of Patent: Apr. 23, 1996

[54] OXIDE DISPERSION-STRENGTHENED ALLOY AND HIGH TEMPERATURE EQUIPMENT COMPOSED OF THE ALLOY

[75] Inventors: Kazuya Nishi; Kishio Hidaka; Tetsuo Kashimura, all of Hitachi; Shigeyoshi Nakamura, Katsuta; Yutaka Fukui; Shinichi Nakahara, both of Hitachi, all of Japan

[73] Assignee: Hitachi, Ltd., Tokyo, Japan

[21] Appl. No.: 310,410

[22] Filed: Sep. 22, 1994

[30] Foreign Application Priority Data

Sep. 27, 1993 [JP] Japan .................. 5-262941

[51] Int. Cl.$^6$ .................................................. C22C 19/05
[52] U.S. Cl. .................... 420/451; 420/453; 420/455
[58] Field of Search .................... 420/451, 453, 420/455

[56] References Cited

U.S. PATENT DOCUMENTS

| | | | |
|---|---|---|---|
| 4,668,312 | 5/1987 | Benn et al. | 148/410 |
| 4,764,225 | 8/1988 | Shankar et al. | 148/404 |
| 4,781,772 | 11/1988 | Benn et al. | 148/404 |
| 4,849,030 | 7/1989 | Darolia et al. | 148/3 |
| 5,006,163 | 4/1991 | Benn et al. | 75/229 |
| 5,439,640 | 8/1995 | Heck et al. | 420/585 |

*Primary Examiner*—Donald P. Walsh
*Assistant Examiner*—Anthony R. Chi
*Attorney, Agent, or Firm*—Antonelli, Terry, Stout & Kraus

[57] ABSTRACT

There is provided an oxide dispersion-strengthened nickel alloy which has a hot working property, a structure stability at high temperature, improved creep characteristics at high temperature and improved heat resistant fatigue characteristics. The oxide dispersion-strengthened alloy is composed of an oxide containing one or more kinds of elements in an amount of 2 wt % or less selected from the group composed of titanium, zirconium and hafnium, chromium in an amount of 15–35 wt %, carbon in an amount of 0.01–0.4 wt % and $Y_2O_3$ in an amount of 0.3–2.0 wt %, and the balance of substantially nickel, wherein $Y_2O_3$ is dispersed as particles in the matrix of the nickel alloy containing one or more kinds of elements selected from the group composed of titanium, zirconium and hafnium, chromium and carbon. The elements of equipment such as the nozzle guide vane of a gas turbine, the liner and transition piece of a combustor, and the like are composed of the oxide dispersion-strengthened alloy of the present invention so that they can be used at high temperature.

6 Claims, 15 Drawing Sheets

5,510,080

OXIDE DISPERSION-STRENGTHENED ALLOY AND HIGH TEMPERATURE EQUIPMENT COMPOSED OF THE ALLOY

BACKGROUND OF THE INVENTION

1. Field of the Invention

The present invention relates to an oxide dispersion-strengthened alloy, and more specifically, to an oxide dispersion-strengthened nickel alloy suitable as a material for high temperature equipment of a gas turbine such as a combustor and the like of the gas turbine.

2. Description of the Related Art

There is a tendency that combustion gas temperature of an industrial gas turbine used for power generation and the like is increased to improve thermal efficiency. For this purpose, a component such as a combustor, bucket and nozzle guide vane of a gas turbine and the like is exposed to a temperature higher than a conventional temperature. On the other, as the temperature of a combustion gas is increased, an increased amount of a nitrogen oxide (hereinafter, abbreviated as NOx) is generated in combustion. Thus, the amount of the generated NOx must be reduced. The most efficient method of reducing an amount of generated NOx is to take out part of compressed air which is used conventionally for component cooling and use the part so that the fuel concentration in a gas mixture composed of the compressed air and fuel is rarefied prior to combustion. Consequently, a material used for a gas turbine which is in contact with a combustion gas having an increased temperature is required to have greatly improved resistance to temperature from the two factors that first a combustion gas has an increased temperature by itself and secondly an amount of cooling air is reduced. Many types of alloys with strength increased at high temperature mainly composed of a Ni alloy were developed and proposed in the past by the improvement of an alloy composition and a manufacturing process and used to a bucket and nozzle guide vane which were made by casting in the equipment constituting a gas turbine. Since a $\gamma'$ phase as a strengthening phase of the Ni alloy is decomposed and vanishes in a high temperature region at 900° C. or higher, however, it is contemplated to be difficult to greatly improve the resistance to temperature of the Ni alloy which is used now. Further, since a material used for the liner and transition piece of a combustor is required to have a hot workability besides high temperature strength so that the material can be rolled to a sheet, any alloy having greatly improved strength as compared with that of existing forging alloys such as Hastelloy X of the Ni alloy, HA188 of a Co alloy and the like is not yet put into practical use.

On the other hand, there are developed oxide dispersion-strengthened alloys as an alloy having resistance to temperature higher than that of conventional forging alloys and casting alloys which is prepared by finely dispersing oxide particles in matrix by a mechanical alloying method. These alloys are developed by an idea that the movement of dislocation generated in the matrix is prevented up to a high temperature region near to the melting point of the alloys by stable oxide particles. A method of manufacturing the oxide dispersion-strengthened alloy is disclosed in Japanese Patent Unexamined Publication No. 47-42507 (1972) and the like by which pure metal, alloy powder and fine powder of oxide such as $Y_2O_3$ and the like as materials are mechanically mixed in a high energy ball mill and then solidified by sintering and further hot worked and heat-treated to grow crystal grains coarse for high temperature use.

This type of the oxide dispersion-strengthened alloys are roughly classified into Ni alloys in which an oxide is mixed with a $\gamma'$ phase to increase strength and alloys strengthened only by an oxide. Since the former alloys strengthened by the mixture of the oxide with the $\gamma'$ phase are strong at a temperature less than 900° C., the application of them to the bucket of a gas turbine is considered. Since it is very difficult to hot forge and hot roll the alloys, however, the application of the alloys to the portion such as the liner of a combustor, and the like where a hot working property is required is difficult. Further, since the $\gamma'$ phase is decomposed at a temperature higher than 900° C., the application of the alloys to the portion such as a first stage nozzle guide vane which is expected to be used at a temperature exceeding 900° C. is difficult. On the other hand, since the latter alloys which are strengthened only by the oxide phase are excellent in a hot rolling property and a structure stability at a high temperature higher than 900° C., Ni alloys such as MA754 and the like are proposed as a material for the nozzle guide vane of an aircraft and a Fe alloy referred to as MA956 is proposed as a material for a combustor by inco Co. Ltd. in U.S.A., respectively.

However, when it is taken into consideration that the combustion temperature of an industrial gas turbine is increased in the future and an amount of generated NOx is increased accordingly, it is expected that an amount of cooling air to be supplied to high temperature equipment such as a first stage nozzle guide vane, combustor and the like must be more reduced than a present amount. In particular, it is also expected that the liner and transition piece of the combustor are used only by convention cooling on the outside wall thereof without film cooling on the inside wall thereof in an extreme case. In such a case, there is a possibility that a material is used at a high temperature reaching 900° or higher and in some cases at a temperature exceeding 1000° C. even if a heat prevention coating is applied onto the surface of the material. At such a high temperature, the existing oxide dispersion-strengthened Ni alloys do not have a sufficient creep rupture strength and thermal fatigue characteristics which are necessary as a structure material. All of these existing oxide dispersion-strengthened Ni alloys contain aluminum in the alloy composition thereof to improve resistance to oxidation at high temperature and to absorb oxygen contained in material powder. Since the oxide dispersion-strengthened alloys use fine metal powder as a material, a content of oxygen which is excessive as compared with that of casting alloys cannot be avoided. The conventional oxide dispersion-strengthened alloys absorb oxygen by forming $Al_2O_3$ by mainly adding aluminum. According to a recent study, it becomes apparent that $Al_2O_3$ reacts with $Y_2O_3$ as a strengthening phase in a manufacturing process and an Y—Al composite oxide is produced. When $Al_2O_3$ is mixed with $Y_2O_3$ as described above, a resistance force against the movement of dislocation is lowered by coarsened oxide particles and accordingly the creep rupture strength and thermal fatigue characteristics of the alloys are also lowered. Aluminum contained in the oxide dispersion-strengthened Ni alloys is very active to $Y_2O_3$ and even if the aluminum content of a material corresponding to MA754 is only 0.3 wt %, almost all the $Y_2O_3$ contained in the alloy is mixed with the aluminum.

Taking the above problems into consideration, an object of the present invention is to provide an oxide dispersion-strengthened Ni alloy having improved high temperature creep characteristics and heat resistant fatigue characteristics while maintaining a hot rolling property and a structure stability at high temperature and to provide high temperature equipment such as the nozzle guide vane, combustor and the like of an industrial gas turbine which can improve the efficiency of the gas turbine without increasing an amount of generated NOx by using the alloy as a structural member thereof.

SUMMARY OF THE INVENTION

The present invention relates to an oxide dispersion-strengthened alloy obtained in such a manner that aluminum contained in a conventional oxide dispersion-strengthened Ni alloy and acting as a factor for lowering high temperature strength by coarsening oxide particles is removed from the composition of the alloy and replaced with titanium or zirconium, hafnium and the alloy is provided with improved strength as well as an excellent hot working property and a structure stability at high temperature by finely crushing oxide particles containing yttrium.

An oxide dispersion-strengthened alloy of the present invention is composed of an oxide containing one or more kinds of elements in an amount of 2 wt % or less selected from the group composed of titanium, zirconium and hafnium, chromium in an amount of 15–35 wt %, carbon in an amount of 0.01–0.4 wt % and yttrium in an amount 0.1–2.0 wt %, and the balance of substantially nickel, wherein an oxide containing yttrium is dispersed as particles in the matrix of the nickel alloy containing one or more kinds of the elements selected from the group composed of titanium, zirconium and hafnium, chromium and carbon.

Another oxide dispersion-strengthened alloy of the present invention is composed of an oxide containing one or more kinds of elements in an amount of 2 wt % or less selected from the group composed of titanium, zirconium and hafnium, chromium in an amount of 15–35 wt %, carbon in an amount of 0.01–0.4 wt %, molybdenum in an amount of 0.3–2.0 wt %, tungsten in an amount of 0.5–10 wt % and yttrium in an amount of 0.1–2.0 wt %, and the balance of substantially nickel, wherein an oxide containing yttrium is dispersed as particles in the matrix of the nickel alloy containing one or more kinds of elements selected from the group composed of titanium, zirconium and hafnium, chromium, carbon, molybdenum and tungsten.

A further oxide dispersion-strengthened alloy of the present invention is composed of an oxide containing one or more kinds of elements in an amount of 2 wt % or less selected from the group composed of titanium, zirconium and hafnium, chromium in an amount of 15–35 wt %, carbon in an amount of 0.01–0.4 wt %, one or more kinds of elements selected from the group composed of tungsten in an amount of 0.5–10 wt %, molybdenum in an amount of 0.3–2.0 wt % and rhenium in an amount of 0.5–3 wt % and yttrium in an amount of 0.1–2.0 wt %, and the balance of substantially nickel, wherein an oxide containing yttrium is dispersed as particles in the matrix of the nickel alloy containing one or more kinds of elements selected from the group composed of titanium, zirconium and hafnium and one or more kinds of elements selected from the group composed of chromium, carbon, tungsten, molybdenum, and rhenium.

The oxide dispersion-strengthened alloy according to the present invention is preferably used to high temperature equipment such as a nozzle guide vane, the liner and transition piece a combustor, and the like as elements constituting a power generation gas turbine.

Each element contained in the oxide dispersion-strengthened alloy of the present invention has the following role.

Chromium is effective to improve resistance to corrosion at high temperature. Although chromium must be contained at least in an amount of 15 wt % or more to obtain sufficient resistance to corrosion at high temperature, when it is added in an amount exceeding 35 wt %, the alloy is made brittle by the occurrence of coarsening of a carbide, and the like. Thus, chromium is preferably added in the range of 20–30 wt %.

Titanium, zirconium and hafnium are added for the purpose of absorbing excessive oxygen contained in the alloy. The conventional oxide dispersion-strengthened alloy absorbs oxygen by forming $Al_2O_3$ by the addition of aluminum. However, $Al_2O_3$ absorbs $Y_2O_3$ as a strengthening factor and forms a coarse composite oxide of $Al_2O_3$ and $Y_2O_3$ in a manufacturing process and lowers high temperature strength. Thus, according to the present invention, titanium, zirconium and hafnium are selected in place of aluminum so as to absorb oxygen in the form of $TiO_2$, $Zr_2O$ and $HfO_2$. Although any of $TiO_2$, $Zr_2O$ and $HfO_2$ forms a composite oxide with $Y_2O_3$ in the alloy, the composite oxide is not coarsened as in the case of $Al_2O_3$ and thus the high temperature strength is not lowered. When one or more kinds of titanium, zirconium and hafnium are added in an amount exceeding 2 wt % in total, there is a possibility that harmful phases such as a η phase and the like are precipitated and the alloy is made brittle. Thus, a proper additive amount is 2.0 wt % or less when titanium is selected, 1.0 wt % or less when zirconium is selected and 1.5 wt % or less when hafnium is selected. A total additive amount of them is more preferably in the range of 0.5 wt %–1.5 wt %.

Tungsten is dissolved in a matrix in the solid state and strengthens the matrix. In particular, tungsten is effective to greatly improve the long time strength of creep. When tungsten is contained in an amount less than 0.5 wt %, it is not sufficiently effective to improve strength, whereas when tungsten is added in an amount exceeding 10 wt %, it assists the precipitation of harmful phases represented by a σ phase and makes the alloy brittle. Thus, the addition of tungsten in such an amount is not preferable. It is preferable that tungsten is added in an amount of 1.0 wt %–7.0 wt % as a more proper additive amount.

Molybdenum is dissolved in the matrix in the solid state and strengthens the matrix in the same way as tungsten. In particular, molybdenum has a great effect for improving long time strength of creep. When molybdenum is contained in an amount less than 0.3 wt %, it does not have a sufficient effect for improving strength, whereas when molybdenum is added in an amount exceeding 2.0 wt %, it assists the precipitation of harmful phases represented by a σ phase and makes the alloy brittle. Thus, the addition of molybdenum in such an amount is not preferable.

Since carbon has an action for strengthening a grain boundary by mainly precipitating a carbide, it is preferable to add carbon at least in an amount of 0.01 wt % or more. On the other hand, when carbon is added in an amount exceeding 0.4 wt %, it assists the coarsening of a carbide and lowers a long time creep rupture strength at high temperature and toughness. Thus, the addition of carbon in such an amount is not preferable.

An oxide $Y_2O_3$ containing yttrium is dispersed into the matrix in the form a composite oxide with $TiO_2$ and improves high temperature strength. Although $Y_2O_3$ must be added in an amount of 0.1 wt % or more to obtain sufficient strength, the addition of it in an amount exceeding 2 wt % lowers ductility and deteriorates a hot working property. It is more preferable to add $Y_2O_3$ in the range of 0.3–1.2 wt % as a proper additive amount. When $Y_2O_3$ is to be mixed, since it is difficult to crush $Y_2O_3$ more finely than raw powder, it is preferable to use raw $Y_2O_3$ powder as fine as possible. In particular, $Y_2O_3$ preferably has a particle size of 0.5 μm or less and more preferably a particle size of 0.001–0.1 μm. When $Y_2O_3$ is composed of fine particles, sufficient strength can be obtained by the dispersion of the $Y_2O_3$ without lowering ductility, even if the $Y_2O_3$ is contained in a very small amount. Therefore, 100 pieces or more of $Y_2O_3$ of the aforesaid particle size are dispersed per wt % per μm$^2$ and in particular it is preferable to disperse 500 pieces or more of the $Y_2O_3$.

Rhenium is mainly dissolved in the matrix in the solid state to strengthen the matrix and also has an effect for improving resistance to oxidation at high temperature. When the content of rhenium is less than 0.5 wt %, the effect for improving the resistance to oxidation is not sufficient, whereas when rhenium is added in an amount exceeding 3 wt %, it increases a manufacturing cost and is disadvantageous.

Next, a method of manufacturing the alloy will be described.

Mechanical alloying can be executed by impact energy, i.e., mechanical energy between steel balls moving in a high energy ball mill or between the steel balls and a vessel in such a manner that the energy is accumulated in powder existing between the steel balls or between the steel balls and the vessel through a compressing and crushing process and a shearing and grinding process. In this case, alloying is also caused in an atom order by diffusion even at a low temperature near to a room temperature by the repetition of forge welding and folding of the powder. High impact energy is needed and the efficiency of the alloying must be also improved to preferably execute the alloying. For this purpose, a weight ratio of material powder and the steel balls is preferably 1/10 to 1/20 in an attritor and 1/5 to 1/10 in a planetary type ball mill, and the ball mill preferably rotates at 150 to 400 rpm. The alloying is executed for 20 hours or longer until the power has a flat layer structure. Note, the attritor is a type of ball mills for mixing material powder with steel balls which are put into a vessel by stirring them with a stirring bar being rotated, and the planetary ball mill is an apparatus for mixing material powder with steel balls by stirring them in such a manner that a vessel containing the material powder and the steel balls is mounted on a rotary stage and revolved and the vessel rotates on its own axis by itself.

The mixed powder is solidified in such a manner that the powder is filled in a vessel made of mild steel or stainless steel and subjected to hot extrusion or HIP according to powder metallurgy. A sintering temperature is preferably 950° to 1200° C. by taking the diffusion and fusion between the powder, elaboration of the powder and the further dissolution of alloy atoms in the solid state.

Thereafter, hot working such as forging, hot rolling and the like and heat treatment are executed to sufficiently exhibit strengthening by the dispersion of the oxide to thereby coarsen crystal grains by secondary recrystallization. The hot working is executed for the purpose of homogenizing the structure after solidification and applying strain energy serving as a driving force for the growth of the crystal grains in the secondary recrystallization. A working temperature is preferably set to the range of 900° C.–1200° C. Since the crystal grains grow along a working direction, the direction of hot rolling and the number of working must be determined by taking the size and shape of a product as well as the shape and size of the crystal grains after recrystallization into consideration. The heat treatment is preferably executed at a temperature as higher as possible so as to effectively cause the secondary recrystallization. Thus, the heat treatment is preferably executed in the range of temperature whose lower limit is 50° C. or more higher than a hot working temperature and whose upper limit is 50° C. or more lower than a melting point of the alloy. When hot or cold working is excessively executed after the heat treatment, since the crystal grains coarsened by the secondary recrystallization are broken and strength is lowered, the working after the heat treatment must be lightly executed to a degree of the adjustment of a size.

When a nozzle guide vane is to be made, it is preferable that an ingot having been subjected to a final heat treatment is formed to a blade shape by machining.

When the liner and transition piece of a combustor are to be made, it is preferable that the ingot is made to a sheet metal by the repetition of hot rolling, formed to a cylindrical shape by a hot working and then subjected to heat treatment. Further, the sheet metal must be joined at one or more positions so that it is formed to a cylindrical shape. One kind, two kinds or more of welding, blazing, diffusion welding, and fixing by screws or rivets may be combined as a joint method. Further, a cylinder having a structure without joint portions may be used. Such a seamless cylinder can be made in such a manner that an ingot is worked to a column shape and formed to a thick cylinder by boring the central portion of the column and the cylinder is further subjected to hot ring rolling.

DETAILED DESCRIPTION OF PREFERRED EMBODIMENTS

Embodiments of the present invention will be described below.

Embodiment 1

Various kinds of tests such as a strength test, analysis of components, and the like were carried out with respect to oxide dispersion-strengthened alloys having various chemical composition shown in Table 1 as test specimens in order to specifically confirm the effect of the present invention. In Table 1, alloys Nos. 1–8 are materials of the present invention and an alloy No. 9 is a comparative material having the same composition as that of the existing alloy MA754.

invention and the alloy No. 9 as a comparative material. In the alloys Nos. 1–3, $Y_2O_3$ was added in an amount of about 6 wt % and only an amount of titanium was varied. The alloys Nos. 1–4 have a creep rupture strength (S) greater than that of the alloy No. 9 containing aluminum in an amount of 0.3 wt % regardless of that they contain the same amount of $Y_2O_3$. Further, the alloys Nos. 1–3 have a tendency that as an additive amount of titanium increases, the creep rupture strength (S) increases. Although the alloy No. 4 containing titanium in an amount of 1 wt % and $Y_2O_3$ in an amount of 0.93 wt % had a strength substantially as large as that of the alloy No. 3, the strength of the alloy No. 4 on a long rupture time side is less deteriorated.

Figure 2:
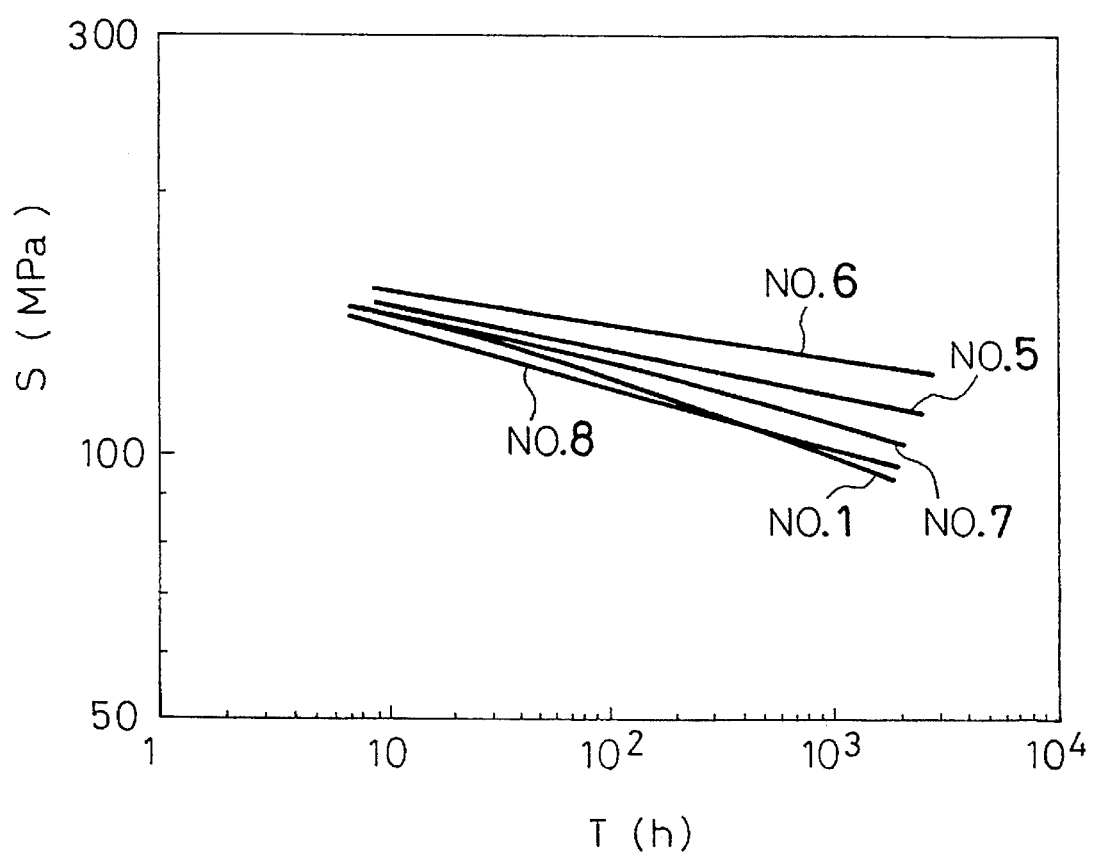
FIG. 2 is a graph showing characteristics of creep rupture strength at 900° C. of materials Nos. 1 and 5–8 of the present invention.

FIG. 2 shows a result of a creep rupture test effected at 900° C. to the alloys Nos. 1 and 5–8. Each of the alloys was added with substantially the same amounts of titanium of about 0.5 wt % and $Y_2O_3$ of about 0.6 wt %. The alloy No. 5 added with molybdenum in an amount of about 0.5 wt % and tungsten in an amount of 2 wt % exhibits a creep rupture strength greater than that of the alloy No. 1 added with only titanium in an amount of 0.5 wt %. The alloy No. 6 whose molybdenum content was increased up to 1.22 wt % and whose tungsten content was increased up to 4.53 wt % has a further increased strength. The alloy No. 7 added with rhenium in an amount of about 1.5 wt % also has an improved creep strength (S) in the region of a longer rupture time (T) as compared with that of the alloy No. 2. Although the alloy No. 8 containing zirconium in an amount of 0.05 wt % and hafnium in an amount of 0.3 wt % has a strength (S) slightly lower than that of the alloy No. 1 on a short

TABLE 1

| | | | | | (Wt %) | | | | | | |
|---|---|---|---|---|---|---|---|---|---|---|---|
| | Component | Ni | Cr | Al | Ti | C | $Y_2O_3$ | Mo | W | Re | Zr | Hf |
| Material of | No. 1 | Bal. | 19.82 | — | 0.49 | 0.13 | 0.61 | — | — | — | — | — |
| Present Invention | No. 2 | Bal. | 19.78 | — | 0.99 | 0.14 | 0.62 | — | — | — | — | — |
| | No. 3 | Bal. | 19.83 | — | 1.42 | 0.14 | 0.59 | — | — | — | — | — |
| | No. 4 | Bal. | 19.86 | — | 1.03 | 0.09 | 0.93 | — | — | — | — | — |
| | No. 5 | Bal. | 19.92 | — | 0.51 | 0.11 | 0.63 | 0.52 | 1.96 | — | — | — |
| | No. 6 | Bal. | 19.59 | — | 0.55 | 0.13 | 0.58 | 1.22 | 4.53 | — | — | — |
| | No. 7 | Bal. | 25.16 | — | 0.54 | 0.10 | 0.59 | — | — | 1.55 | — | — |
| | No. 8 | Bal. | 19.84 | — | 0.51 | 0.11 | 0.61 | — | — | — | 0.05 | 0.33 |
| Comparative Material | No. 9 | Bal. | 19.93 | 0.32 | 0.50 | 0.13 | 0.58 | — | — | — | — | — |

A result of the various tests will be described below. Metal element powder having an average grain size of 100 μm or less, carbon powder and $Y_2O_3$ fine powder having an average grain size of 200 Å were mixed together according to the respective compositions of the alloys Nos. 1–9, put into a planetary type ball mill and mechanically alloyed in an Ar atmosphere. The ball mill was rotated at 165 r.p.m. and a milling time was 30 hours. The thus obtained mixed powder was put into a capsule made of mild steel and heated for 30 minutes at 100° C., 200° C. and 300° C., respectively while the capsule was evacuated at $10^{-2}$– $10^{-4}$ Torr. Thus, the inside wall of the capsule and the powder were degassed and then the powder was sealed with vacuum. The powder was solidified by means of HIP processing under the conditions of 1050° C., 2000 kgf/cm² and a holding time of one hour. Further, the solidified powder was processed to a 2 μm thick sheet by being subjected to forging and hot rolling at a high temperature of 950°–1050° C. and then subjected to vacuum heat treatment for one hour at 1300° C. to make test materials.

Figure 1:
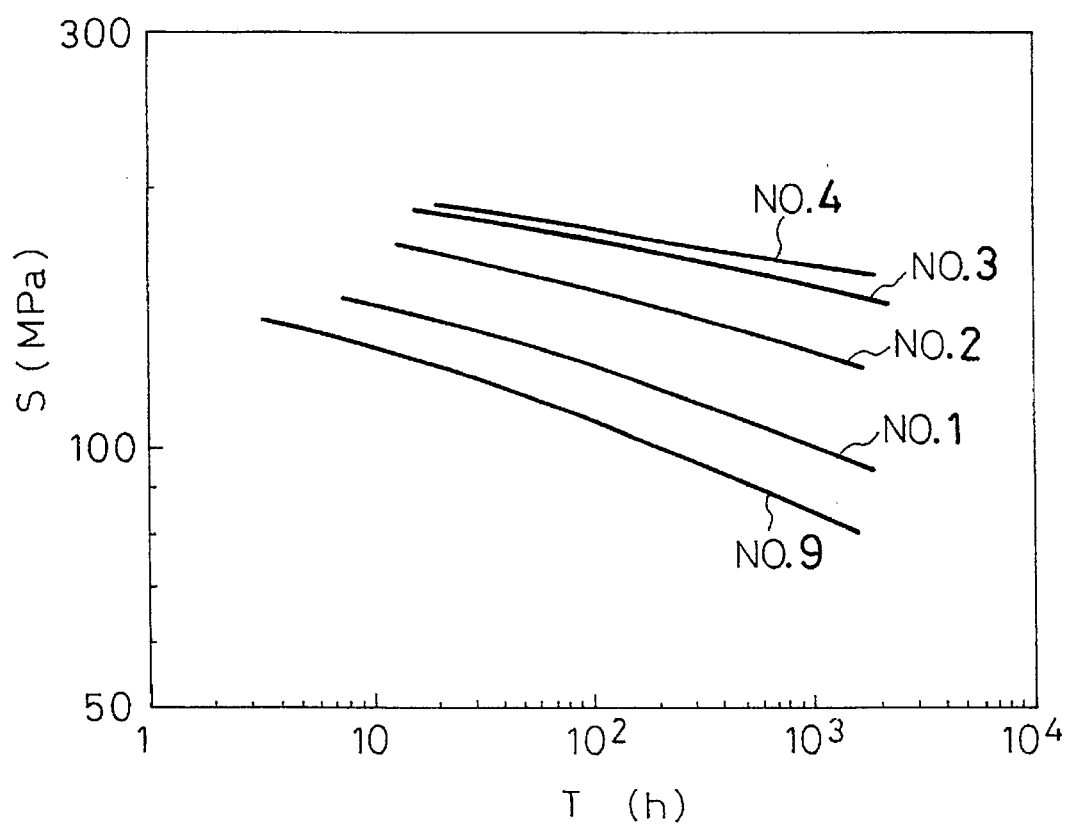
FIG. 1 is a graph showing characteristics of creep rupture strength at 900° C. of materials Nos. 1–4 of the present invention and a comparative material No. 9.

FIG. 1 shows a result of a creep rupture test effected at 900° C. to the alloys Nos. 1–4 as the materials of the present rupture time (T) side, the alloy No. 8 exhibits a strength (S) similar to or greater than that of the alloy 1 in the region greater than 500 hours.

Figure 3:
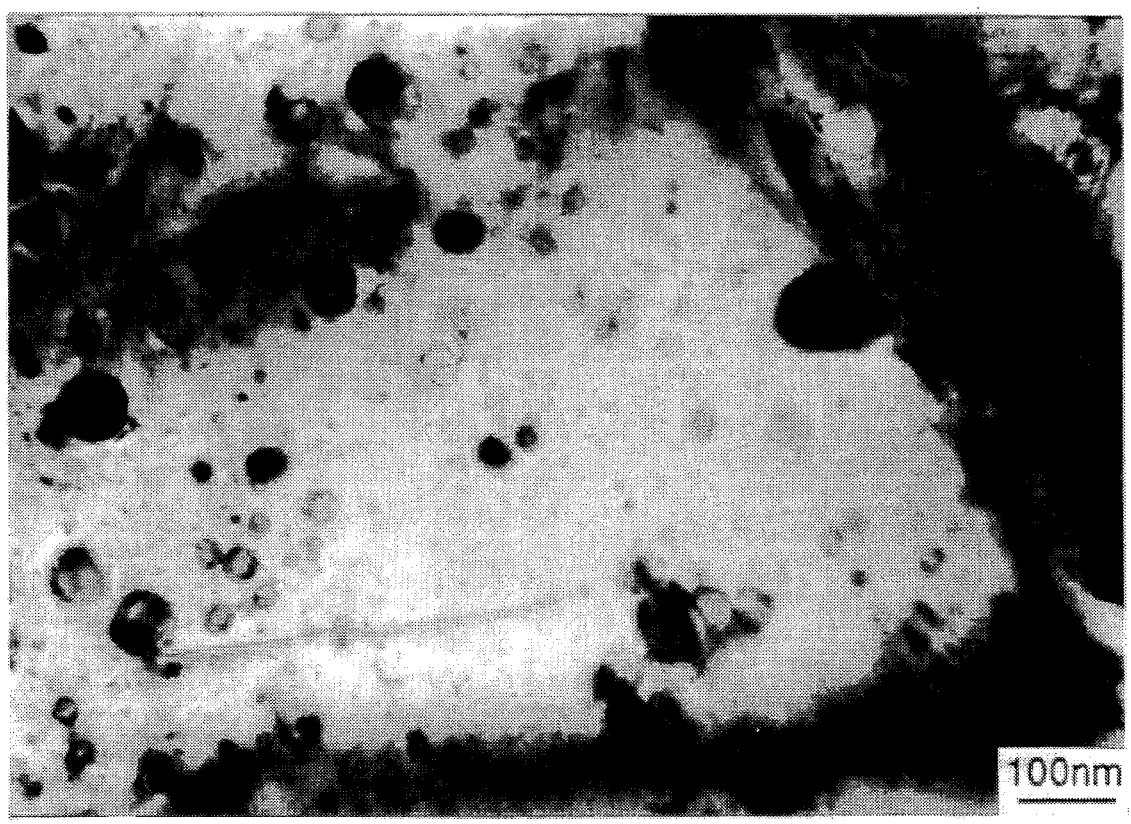
FIG. 3 is a photograph taken by a transmission electron microscope (TEM) to show the metal structure of the comparative material No. 9.
Figure 4:
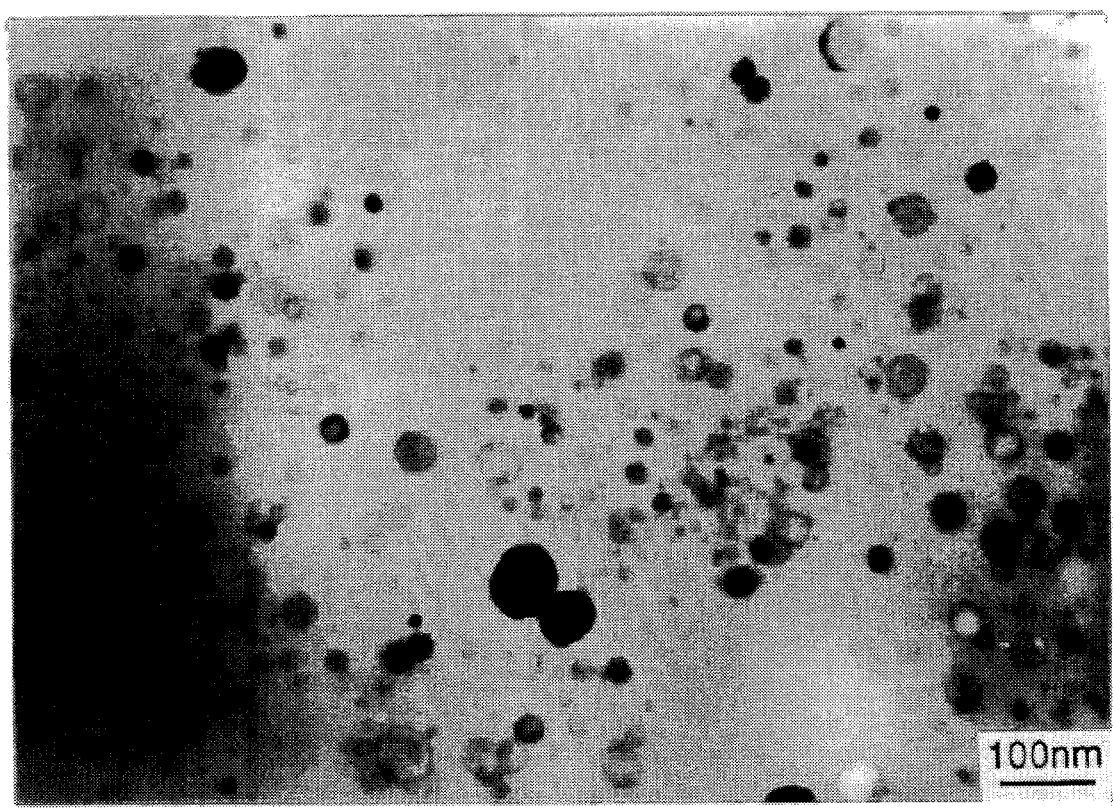
FIG. 4 is a photograph taken by the TEM to show the metal structure of the material No. 2 of the present invention.

FIG. 3 shows a photograph of a metallurgical structure of the comparative material No. 9 taken by a transmission electron microscope (TEM) and FIG. 4 shows that of the material No. 2 of the present invention. Test pieces were prepared by cutting off the test materials to disks each having a diameter of 3 mm, a thickness of 0.2 mm and reducing the thickness of the disks by electrolytic grinding. The both alloys were presumed to have oxides containing $Y_2O_3$. The dispersion of fine particles having a diameter of 1000 Å or less was observed. When the average particle size of the dispersed particles was investigated from the photographs, it could be confirmed that the material No. 2 of the present invention had an average particle size of 169 Å the comparative material No. 9 had an average particle size of 236 Å and thus the material No. 2 of the present invention had a finer particle size. Further, when the ratio of an average distance between two particles adjacent each other was investigated, the comparative material No. 9 had an average distance between particles which was 1.4 times that of the material No. 2 of the present invention. Generally speaking, when an oxide dispersion-strengthened alloy is strengthened by the dispersion of fine particles, the strength of the alloy is in inverse proportion to an average distance between the dispersed particles and thus the strength of the alloy is increased by narrowing the distance between particles. It is contemplated that since the oxide particles of the materials Nos. 1–8 of the present invention were finely crushed in a manufacturing process and a distance between particles was narrowed, the creep rupture strength of these materials was more improved than that of the comparative example No. 9. About 660 pieces of an oxide were confirmed to be scattered in matrix per $\mu m^2$ in the material No. 9 of the present invention. This means that the dispersion is about 1000 pieces or more per wt %.

Figure 5:
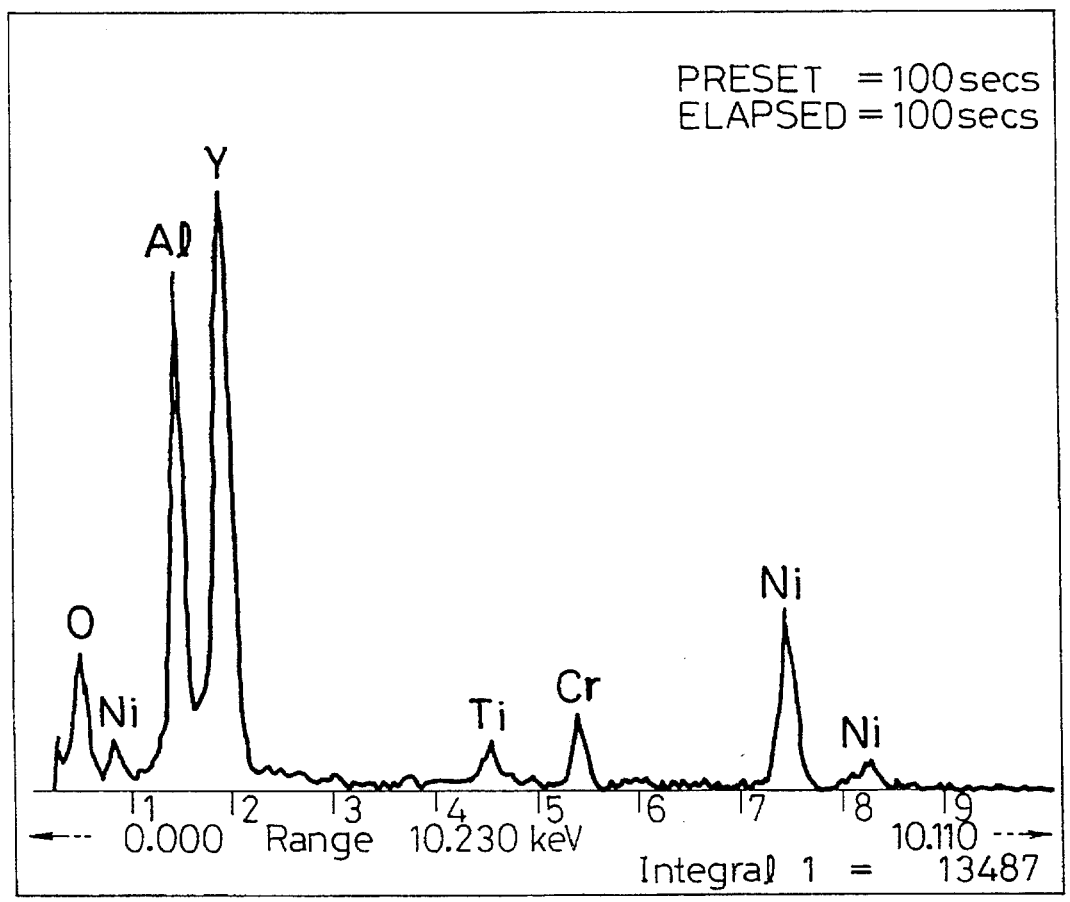
FIG. 5 is a graph showing a result of energy dispersive X-ray (EDX) analysis of the dispersed particles in the comparative material No. 9.
Figure 6:
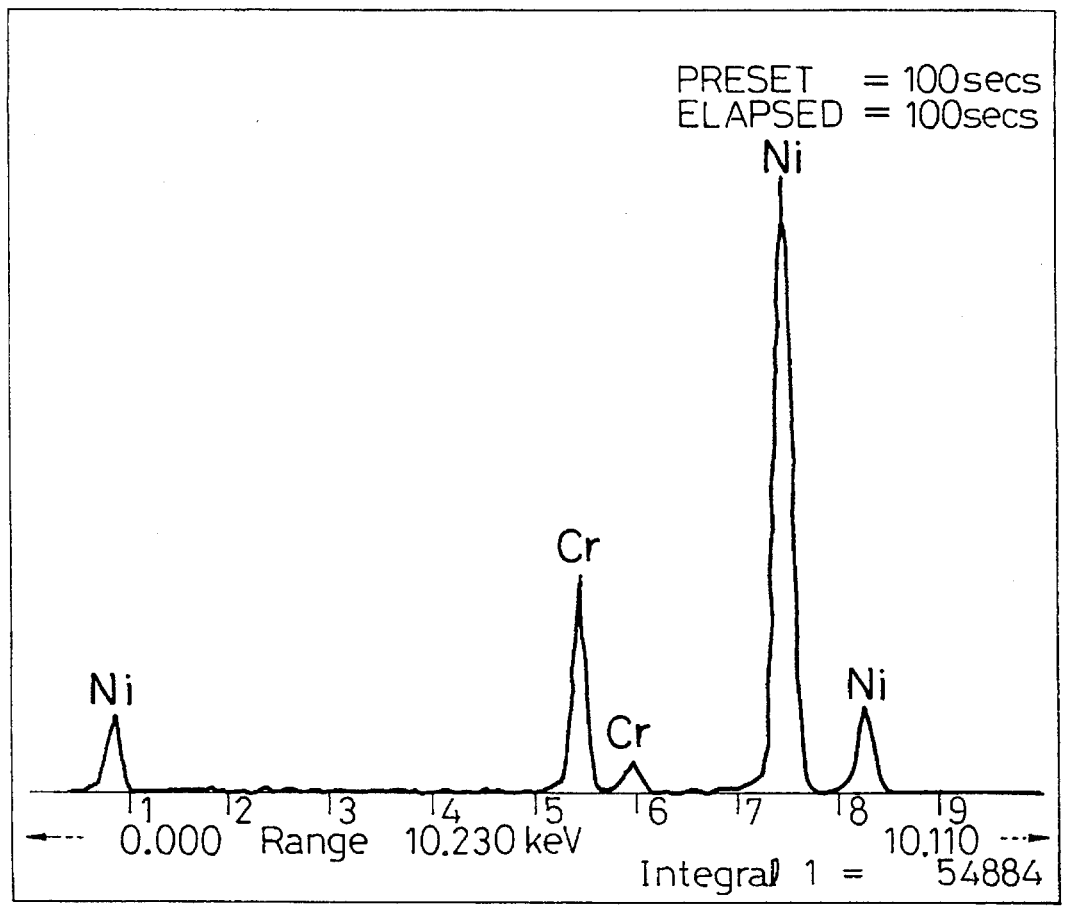
FIG. 6 is a graph showing a result of EDX analysis of the matrix of the comparative material No. 9.
Figure 7:
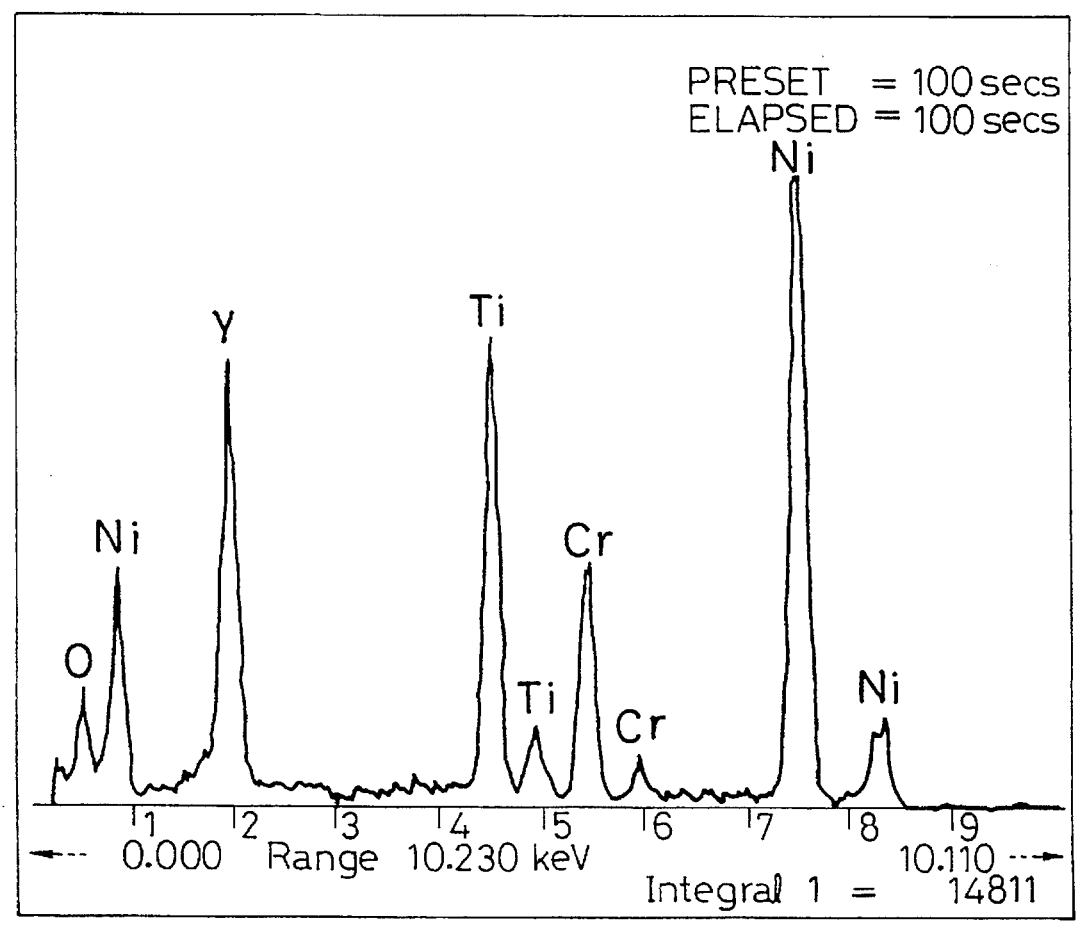
FIG. 7 is a graph showing a result of EDX analysis of the dispersed particles in the material No. 2 of the present invention.
Figure 8:
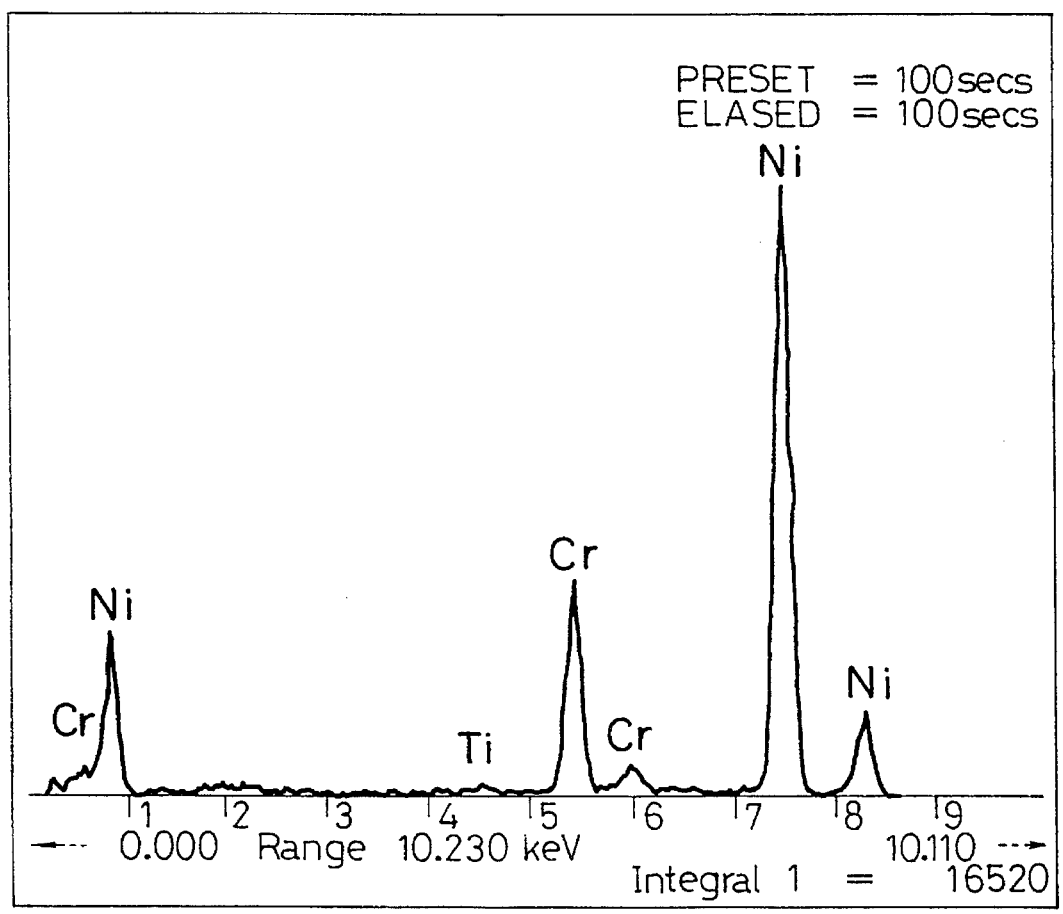
FIG. 8 is a graph showing a result of EDX analysis of the matrix of the material No. 2 of the present invention.

Next, the composition of dispersed particles in the above thin film test pieces was analyzed by EDX analysis. An electron beam had probe diameter of 200 Å. FIG. 5 shows an EDX spectrum of the dispersed particles of the comparative material No. 9 and FIG. 6 shows an EDX spectrum of the matrix of the comparative material No. 9, respectively. High peaks of yttrium (Y) and aluminum (Al) and a slight peak of titanium (Ti) appear in the spectrum of the dispersed particles, whereas clear peaks of elements other than Nickel (Ni) and chromium (Cr) cannot be found in the spectrum of the matrix. FIG. 7 shows an EDX spectrum of the dispersed particles of the material No. 2 of the present invention and FIG. 8 shows an EDX spectrum of the matrix of the material No. 2. The spectrum of the matrix of the material No. 2 of the present invention is substantially the same as that of the matrix of the comparative material No. 9. On the other hand, no peak of aluminum exists in the spectrum of the dispersed particles of the material No. 2 and a very high peak of titanium is observed in the spectrum. Substantially the same spectra were obtained from the EDX analysis of the materials Nos. 1, 3, 4 or the present invention. It is presumed from a result of the above analysis that the added $Y_2O_3$ absorbed aluminum in the comparative material No. 9 and titanium in the materials Nos. 1–4 of the present invention, respectively and formed composite oxides having a different composition. When the oxide phases of the alloys were collected by an extraction replica method and the compositions thereof were identified by electron beam diffraction, it was confirmed that the oxide phase of the comparative material No. 9 was $2Y_2O_3 \cdot Al_2O_3$ and the oxide phase of the materials Nos. 1–4 of the present invention was $Y_2O_3 \cdot 2TiO_2$. It is contemplated that $Y_2O_3$ was mixed with $TiO_2$ in the materials of the present invention to thereby reduce the particle size of the oxide. Further, in the case of the comparative material No. 9 containing aluminum, it is contemplated that $Y_2O_3$ preferentially reacted with $Al_2O_3$, and as a result the $Y_2O_3$ was prevented from being mixed $TiO_2$ and thus the composite oxide was coarsened.

Figure 20:
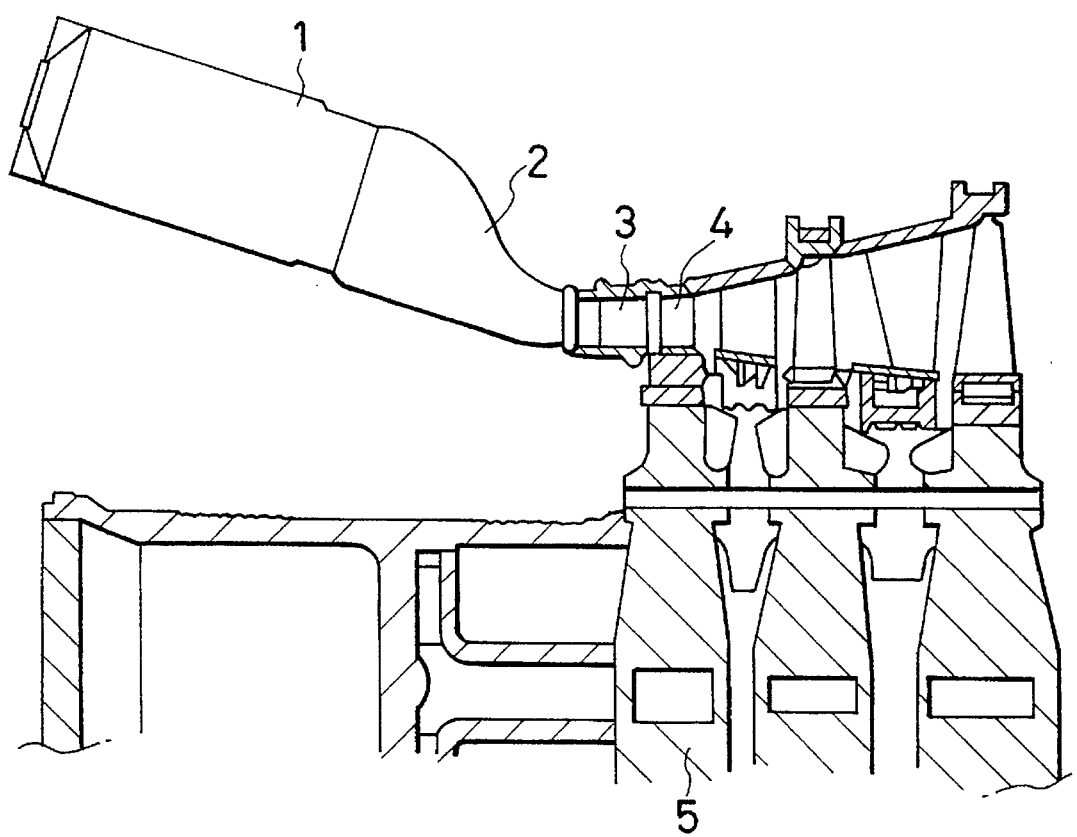
FIG. 20 is a cross sectional view of a gas turbine according to the present invention.

FIG. 20 shows an embodiment of a gas turbine according to the present invention. The liner 1 and transition piece 2 of a combustor and a first stage nozzle guide vane 3 are composed of the oxide dispersion-strengthened Ni alloy according to the present invention. These members have a sufficient high temperature strength. Note, numeral 4 denotes a first stage nozzle guide vane and numeral 5 denotes a disk.

Embodiment 2

Figure 9:
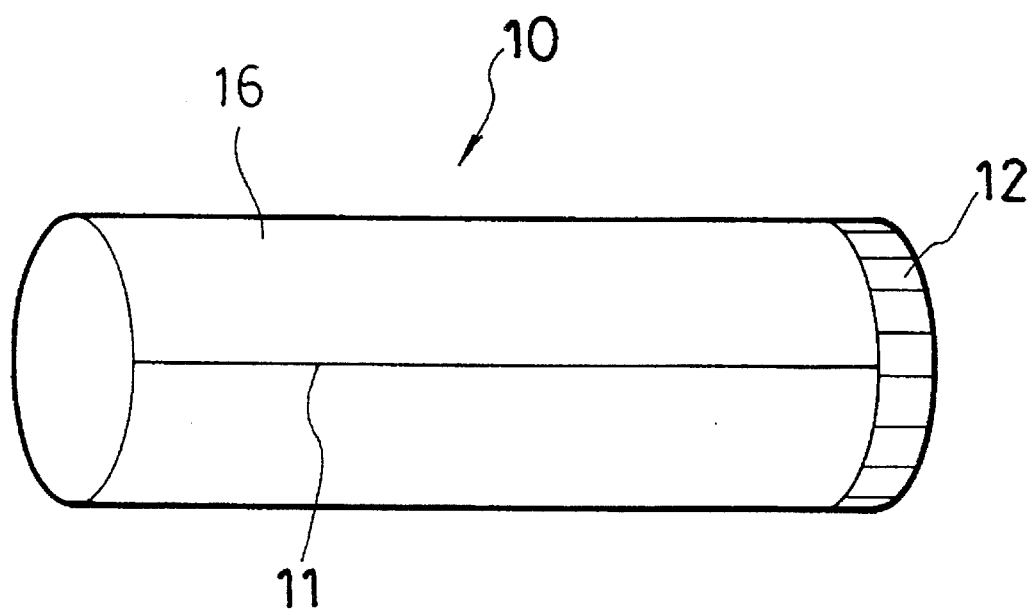
FIG. 9 shows a combustor liner of a gas turbine for power generation in Embodiment 2.

A combustor liner 10 of a gas turbine for power generation shown in FIG. 9 was made of the alloy No. 5 shown in Table 1 of Embodiment 1. Material powder of 5 kg was mechanically alloyed in an attritor for 30 hours and the powder collected was vacuum sealed in a mild steel capsule and then solidified by a HIP processing. The HIP processing was effected under the conditions of 1050° C., 1500 kgf/cm³ and holding time of one hour. An alloy ingot solidified was repeatedly subjected to hot rolling at about 1000° C. and heat treatment for strain relief so that the alloy ingot was processed to a 2-mm-thick sheet. The thus obtained sheet was further subjected to a hot bending process to make a cylinder 16 having a diameter of 250 mm and a length of 300 mm. Thereafter, the cylinder 16 was subjected to heat treatment at 1300° C. for one hour to coarsen the crystal grain thereof and the butt joint 11 of the cylinder 16 was welded by a laser beam. Since the alloy of the present invention can endures a high temperature of 900° C. or more, the alloy can reduce an amount of cooling air to be used in operation as compared with that used by a conventional combustion liner. Consequently, cooling holes for film cooling need not be provided on the surface of the liner 10 and the liner 10 can be used only by convection cooling on the outside wall of the liner when the turbine is operated. A spring seal 12 to be connected to a transition piece provided on the rear side of the liner 10 by spot welding. The spring seal 12 is composed of a forged Ni alloy corresponding to X-750. Further, coating was applied to the inside wall of the liner 10 to improve oxidation resistant characteristics and corrosion resistant characteristics. Furthermore, ceramics ($ZrO_2$) was coated on inside wall for the prevention of heat.

Embodiment 3

Figure 10:
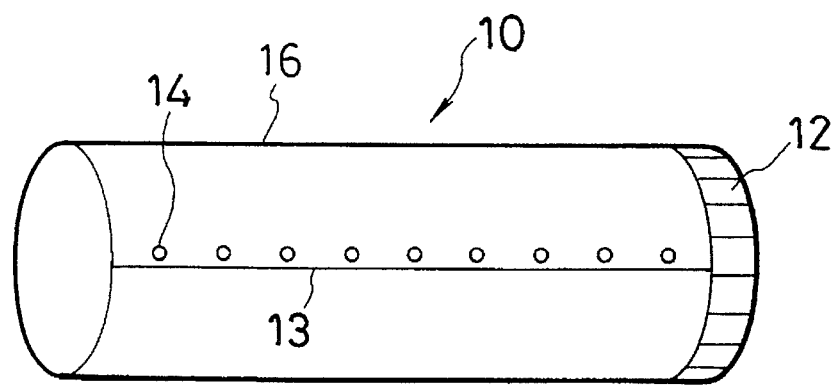
FIG. 10 shows a combustor liner of a gas turbine for power generation in Embodiment 3.
Figure 11:
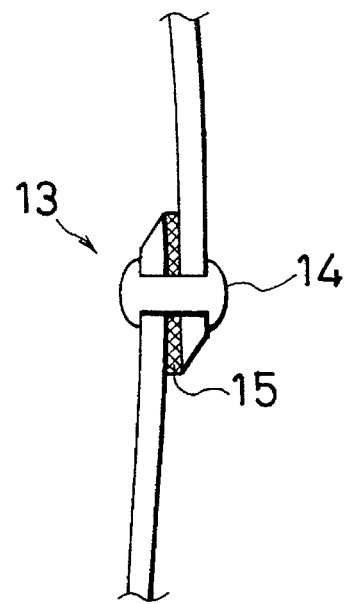
FIG. 11 shows a structure of a joint portion in Embodiment 3.

A combustor liner of a gas turbine for power generation was made by processing the alloy No. 5 to a cylindrical shape by the same manufacturing process as that of Embodiment 2 and then joining the overlap joint portions 13 of a thus obtained cylinder 16 by rivets 14. FIG. 10 shows the structure of the combustor liner 10. The rivets 14 were made of the alloy No. 5. The faced-up portions 13 of the sheets to be joined were sealed by vacuum brazing. FIG. 11 shows a structure of the joint portion 13. A brazing material 15 was composed of an alloy having a component near to that of the matrix of the alloy No. 5. Cooling holes for film cooling were not provided on the surface of the liner. Coating similar to that of Embodiment 2 was applied to the inside wall of the liner.

Embodiment 4

Figure 12:
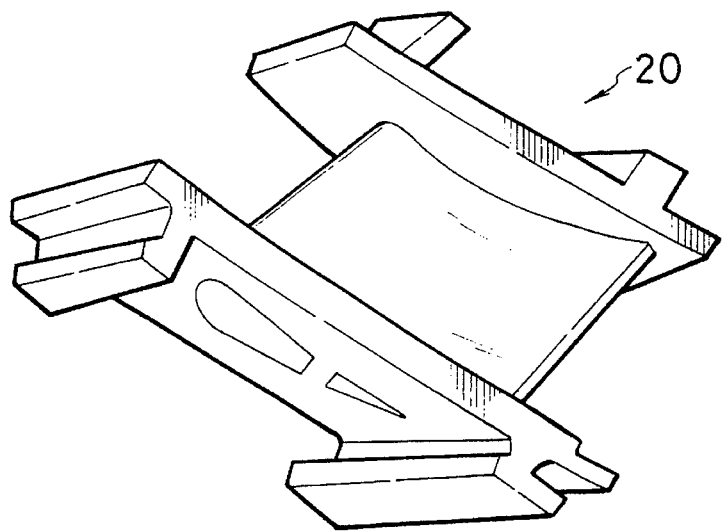
FIG. 12 shows a nozzle guide vane of a gas turbine for power generation in Embodiment 4.
Figure 13:
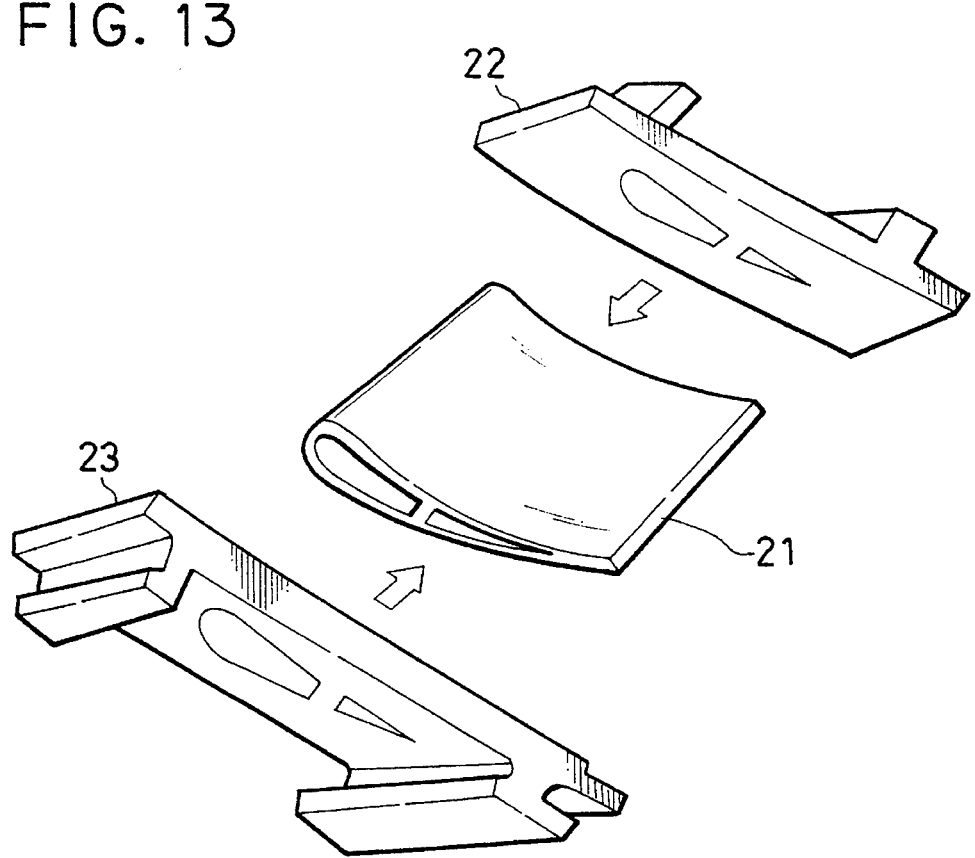
FIG. 13 shows an assembling process for a vane portion and side wall portions in Embodiment 4.
Figure 14:
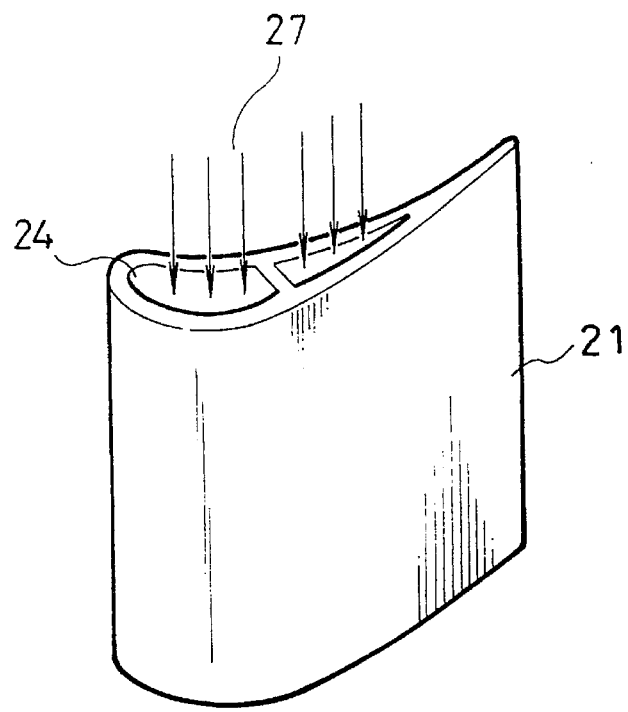
FIG. 14 shows an outside view of the convex side of the vane portion in Embodiment 4 prior to joint.
Figure 15:
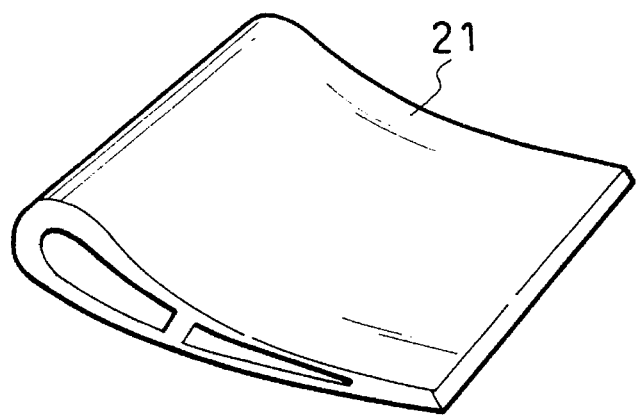
FIG. 15 shows an outside view of the concave side of the vane portion in Embodiment 4 prior to joint.

A nozzle guide vane 20 of a gas turbine for power generation shown in FIG. 12 was made of the alloy No. 6 shown in Table 1 of Embodiment 1. Material powder was mechanically alloyed in an attritor for 30 hours and the powder collected was vacuum sealed in a mild steel capsule and then solidified by hot extrusion to provide an ingot. The ingot was forged and then subjected to heat treatment at about 1300° C. and further divided into three portions, i.e., a vane portion and both side wall portions by machining. Finally, a target configuration was achieved by joining the thee portions by vacuum brazing. FIG. 13 shows a process for assembling the vane portion 21 and the side wall portions 22, 23. FIG. 14 shows an outside view of the convex side of the vane portion 21 before it is assembled. FIG. 15 shows an outside view of the concave side of the blade portion 21. Although a cavity 24 is formed in the interior of the blade portion 21 so that cooling air 27 passes therethrough, any cooling holes which pass from the interior of the vane portion to the surface thereof are provided neither to the convex side nor to the concave side of the vane portion.

Embodiment 5

Figure 16:
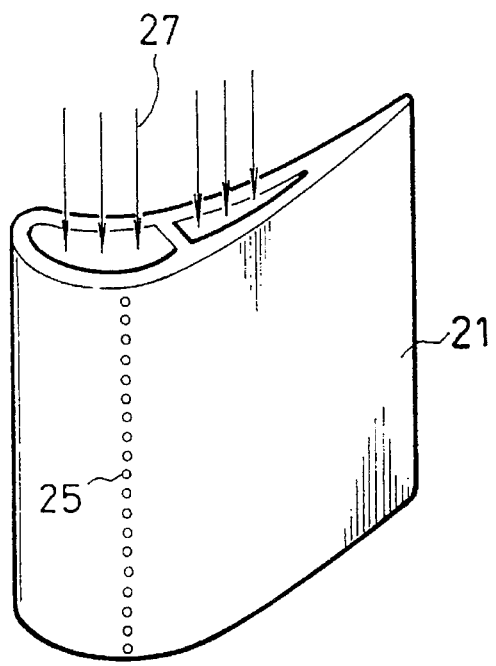
FIG. 16 shows an outside view of the convex side of the vane portion in Embodiment 5 prior to joint.
Figure 17:
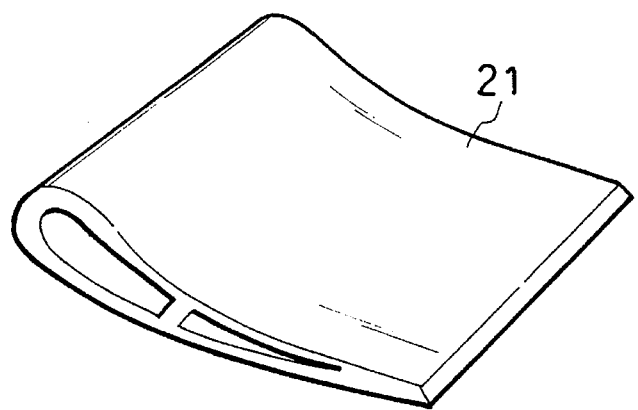
FIG. 17 shows an outside view of the concave side of the vane portion in Embodiment 5 prior to joint.

A nozzle guide vane for a gas turbine for power generation was made of the alloy No. 6 by the same manufacturing method as that of Embodiment 4. FIG. 16 shows an outside view of the convex side of a vane portion 21 before it is joined and FIG. 17 shows the concave side of the vane portion 21. The nozzle guide vane improves a cooling effect when the turbine is in operation by the provision of film cooling holes 25 at the leading edge on the convex side of the vane portion 21. Thus, the nozzle guide vane can be operated in high temperature environment.

Embodiment 6

Figure 18:
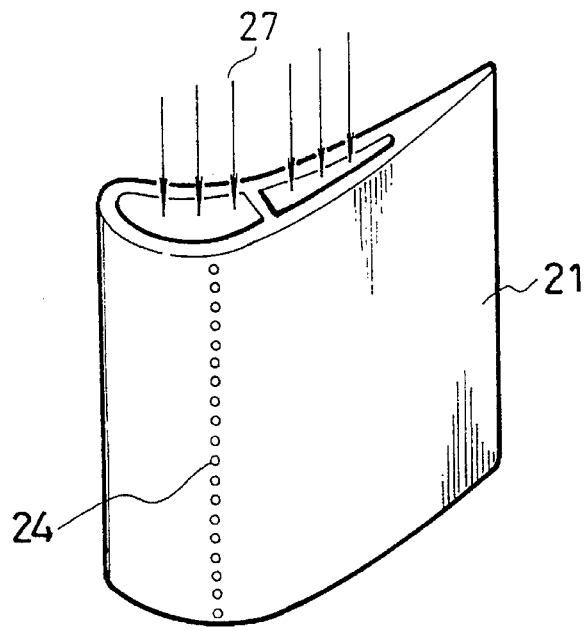
FIG. 18 shows an outside view of the convex side of the vane portion in Embodiment 6 prior to joint.
Figure 19:
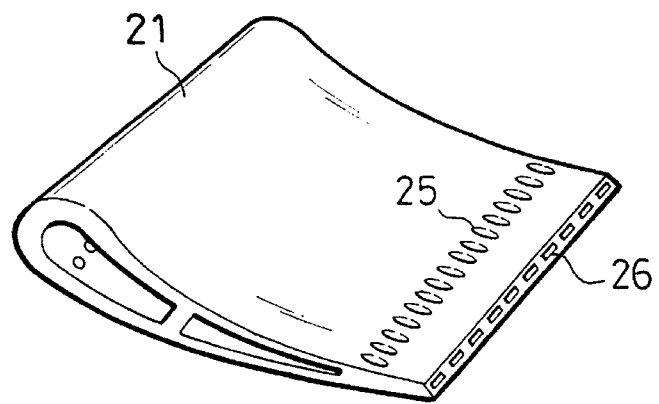
FIG. 19 shows an outside view of the concave side of the vane portion in Embodiment 6 prior to joint.

A nozzle guide vane for a gas turbine for power generation was made of the alloy No. 6 by the same manufacturing method as that of Embodiment 4. FIG. 18 shows an outside view of the convex side of a vane portion 21 before it is joined and FIG. 19 shows the concave side of the vane portion 21. The nozzle guide vane improves a cooling effect when the turbine is in operation by the provision of film cooling holes 26 defined to the trailing edge on the concave side of the vane portion 21 and additional cooling holes provided in the interior of the trailing edge, in addition to film cooling holes 25 provided to the leading edge on the convex side of the vane portion 21.

According to the present invention, since there can be obtained the oxide dispersion-strengthened Ni alloy which has an excellent high temperature strength, a good hot working property and a structure stability at high temperature for a long time, the high temperature equipment of an industrial gas turbine, in particular, the structural member thereof such as a nozzle guide vane, combustor and the like has a prolonged life and further an improved resistance to temperature, whereby an amount of NOx generated can be reduced when the gas turbine is in operation.

We claim:

1. An oxide dispersion-strengthened alloy, composed of an oxide containing one or more kinds of elements in an amount of 2 wt % or less selected from the group composed of titanium, zirconium and hafnium, chromium in an amount of 15–35 wt %, carbon in an amount of 0.01–0.4 wt % and yttrium in an amount of 0.1–2.0 wt %, and the balance of substantially nickel, wherein an oxide containing yttrium is dispersed as particles in the matrix of the nickel alloy containing one or more kinds of the elements selected from the group composed of titanium, zirconium and hafnium, chromium and carbon.

2. An oxide dispersion-strengthened alloy, composed of an oxide containing one or more kinds of elements in an amount of 2 wt % or less selected from the group composed of titanium, zirconium and hafnium, chromium in an amount of 15–35 wt %, carbon in an amount of 0.01–0.4 wt %, molybdenum in an amount of 0.3–2.0 wt %, tungsten in an amount of 0.5–10 wt % and yttrium in an amount of 0.1–2.0 wt %, and the balance of substantially nickel, wherein an oxide containing yttrium is dispersed as particles in the matrix of the nickel alloy containing one or more kinds of elements selected from the group composed of titanium, zirconium and hafnium, chromium, carbon, molybdenum and tungsten.

3. An oxide dispersion-strengthened alloy, composed of an oxide containing one or more kinds of elements in an amount of 2 wt % or less selected from the group composed of titanium, zirconium and hafnium, chromium in an amount of 15–35 wt %, carbon in an amount of 0.01–0.4 wt %, one or more kind of elements selected from the group composed of tungsten is an amount of 0.5–10 wt %, molybdenum in an amount of 0.3–2.0 wt % and rhenium in an amount of 0.5–3 wt % and yttrium in an amount of 0.1–2.0 wt %, and the balance of substantially nickel, wherein an oxide containing yttrium is dispersed as particles in the matrix of the nickel alloy containing one or more kinds of elements selected from the group composed of titanium, zirconium and hafnium and one or more kinds of elements selected from the group composed of chromium, carbon, tungsten, molybdenum and rhenium.

4. A nozzle guide vane of a gas turbine for power generation, composed of the oxide dispersion-strengthened alloy according to any of claims 1 to 3.

5. A cylindrical combustor for combusting jetted fuel and guiding a combusted gas to a turbine nozzle guide vane, wherein the liner of said combustor exposed to the combusted gas of said combustor is composed of the oxide dispersion-strengthened alloy according to any of claims 1 to 3.

6. A transition piece for a combustor of a gas turbine for power generation for combusting jetted fuel and guiding a combusted gas to turbine nozzles, composed of the oxide dispersion-strengthened alloy according to any of claims 1 to 3.

* * * * *